United States Patent
Greenfield (10) Patent No.: US 10,721,531 B1
(45) Date of Patent: *Jul. 21, 2020

(54) ON-DEMAND SESSION INITIATION AND MANAGEMENT

(71) Applicant: CSC Holdings, LLC, Bethpage, NY (US)

(72) Inventor: Jonathan Greenfield, Miller Place, NY (US)

(73) Assignee: CSC Holdings, LLC, Bethpage, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/795,700

(22) Filed: Oct. 27, 2017

Related U.S. Application Data (63) Continuation of application No. 14/833,593, filed on Aug. 24, 2015, now Pat. No. 9,854,316, which is a continuation of application No. 12/794,079, filed on Jun. 4, 2010, now Pat. No. 9,118,942.

(51) Int. Cl.
| | |
|---|---|
| *H04N 21/478* | (2011.01) |
| *H04N 21/20* | (2011.01) |
| *H04N 21/437* | (2011.01) |
| *H04N 21/472* | (2011.01) |
| *H04N 7/173* | (2011.01) |
| *H04L 29/06* | (2006.01) |
| *H04L 29/08* | (2006.01) |

(52) U.S. Cl.
CPC ......... *H04N 21/4781* (2013.01); *H04L 65/60* (2013.01); *H04L 67/10* (2013.01); *H04L 67/141* (2013.01); *H04N 7/17336* (2013.01); *H04N 21/20* (2013.01); *H04N 21/437* (2013.01); *H04N 21/47202* (2013.01)

(58) Field of Classification Search
CPC .......... H04N 21/2396; H04N 21/4781; H04N 21/47202
USPC .................. 725/13, 32, 58, 87, 95, 96, 135; 375/240.01; 709/203, 206, 223, 224
See application file for complete search history.

(56) References Cited

U.S. PATENT DOCUMENTS

| | | |
|---|---|---|
| 5,905,522 A | 5/1999 | Lawler |
| 8,151,308 B1 | 4/2012 | Chauvin et al. |
| 8,190,769 B1 | 5/2012 | Shukla et al. |
| 9,118,942 B2 | 8/2015 | Greenfield |
| 2002/0035697 A1 | 3/2002 | McCurdy et al. |
| 2003/0101213 A1* | 5/2003 | Wright .................. H04L 29/06 709/203 |
| 2004/0006771 A1 | 1/2004 | Dale et al. |

(Continued)

OTHER PUBLICATIONS

U.S. Appl. No. 14/833,593, filed Aug. 24, 2015, entitled "On-Demand Session Initiation and Management".

*Primary Examiner* — Joshua D Taylor
(74) *Attorney, Agent, or Firm* — Sterne, Kessler, Goldstein & Fox P.L.L.C.

(57) ABSTRACT

Methods and systems to provide and manage on-demand sessions are described herein. A first on-demand session for a client is conducted when resources are available for the first on-demand session. When a notification of termination of the first on-demand session is received, the resources are reserved for the client for a time period. When a second request from the client for a second on-demand session is received during the time period, the second on-demand session is started using the reserved resources.

21 Claims, 6 Drawing Sheets

(56) References Cited

U.S. PATENT DOCUMENTS

| | | |
|---|---|---|
| 2006/0013129 A1 | 1/2006 | Sterenson et al. |
| 2006/0107304 A1* | 5/2006 | Cleron ............... H04N 5/44543 |
| | | 725/135 |
| 2006/0200558 A1* | 9/2006 | Sherer ................ H04L 12/1881 |
| | | 709/224 |
| 2006/0206600 A1* | 9/2006 | Wong ................ H04L 29/06027 |
| | | 709/223 |
| 2007/0061831 A1 | 3/2007 | Savoor et al. |
| 2008/0229379 A1 | 9/2008 | Akhter |
| 2009/0025027 A1* | 1/2009 | Craner ................ H04H 20/103 |
| | | 725/32 |
| 2009/0157826 A1* | 6/2009 | Stettner ............... H04L 65/4076 |
| | | 709/206 |
| 2009/0199250 A1 | 8/2009 | Assouline et al. |
| 2010/0107205 A1 | 4/2010 | Foti |
| 2010/0202509 A1 | 8/2010 | Thompson et al. |
| 2011/0016492 A1 | 1/2011 | Morita |

\* cited by examiner

FIG. 6

ON-DEMAND SESSION INITIATION AND MANAGEMENT

CROSS REFERENCE TO RELATED APPLICATIONS

This application is a continuation of U.S. patent application Ser. No. 14/833,593, filed Aug. 24, 2015, now U.S. Pat. No. 9,854,316, which is a continuation of U.S. patent application Ser. No. 12/794,079, filed Jun. 4, 2010, now U.S. Pat. No. 9,118,942, all of which are incorporated by reference herein in their respective entireties.

BACKGROUND OF THE INVENTION

Field of the Invention

The invention generally relates to on-demand session management.

Background Art

In systems delivering on-demand services, such as cable television Video On Demand (VOD), switched video systems and video game servers, customers access services using sessions where the system is capable of initiating a limited number of simultaneous sessions. With increasing user demand, especially during peak usage hours, the user experience deteriorates when sufficient resources are not available to grant a user a requested on-demand session.

Methods and systems are needed to overcome the above mentioned deficiency.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present embodiments will now be described with reference to the accompanying drawings. In the drawings, like reference numbers may indicate identical or functionally similar elements.

DETAILED DESCRIPTION OF THE INVENTION

In systems delivering on-demand services, such as cable television VOD, switched video systems and video game servers, customers access services using sessions where the system is capable of initiating a limited number of simultaneous sessions. Conceptually, these on-demand systems are very similar to traditional telephony systems, where a limited number of circuits are available to connect calls from a large number of phones. When a customer attempts to connect a call while all circuits are already occupied, they are unable to do so and receive a "busy signal" indicating that all circuits are occupied and the call cannot be made. Operators can theoretically build systems with adequate capacity to almost always meet customer demand. However, it is prohibitively expensive to build systems and infrastructure that always meet customer demand and guarantees that no customer will ever receive a busy signal. Furthermore, due to the statistical nature of such systems, achieving even small incremental improvements in success rates may require substantial increases in infrastructure capacity.

On-demand systems typically experience a high volume of requests for on-demand sessions during peak hours such as weekend nights. The user experience when the on-demand system is unable to allocate a requested session is typically very poor. Similar to a telephone user receiving a busy signal, an on-demand system user has no other option other than to repeatedly retry making their call, until a circuit is available. Existing telephone "busy redial" systems do not address the condition where all circuits are occupied. The busy redial system only addresses the case where the dialed telephone number is currently in use by a user at the other end. When the user at the other end completes their call, the busy redial system dials their number. However, for a "busy signal" where all circuits are occupied, a telephone user has to manually re-try making the call till a circuit is available to complete the call.

Similarly, a user of an on-demand system typically has no choice but to manually re-request the session until system capacity at the on-demand server becomes available to provide the requested session. Failure to obtain a requested session for on-demand services such as a VOD session, or a switched video session, is often even more disruptive to a user than a busy signal when making a telephone call. While having to delay a telephone call may be a nuisance, a delay in tuning a television program delivered via, for example, a switched video system can mean missing all or a portion of the program. Failing to order a VOD session may disrupt a primary entertainment activity. Repeatedly and manually trying to retry accessing an on-demand session is time consuming, frustrating and offers a poor user experience.

In another example, a user may experience disruption in the middle of their on-demand session, due to the nature of how on-demand services are provided. For example, a user viewing a television program via switched video might change channels during the program, for example, to briefly check the status of a sporting event. Upon attempting to return to their original program, the user may find that they are unable to retune the switched video session. Similarly, a user perusing available VOD options may attempt to view multiple movie trailers and might find that sometimes they are successful in viewing the trailers and sometimes they are not. This is because a user is assigned a certain amount of resources by the on-demand server to view the first trailer. When the user wishes to view another trailer, the session ends and the resources allotted to view the first trailer may not be available to view a second trailer. The resources may not be available because the on-demand server may have allocated the resources to another user and there may not be sufficient resources available to start a session for the second trailer. In another example, a user might view a trailer, decide to watch the movie, and then fail to obtain a session upon ordering the movie. This may happen because the resources used by the user to view the trailer may be allocated to another user when the user switches to a new session to watch the actual movie.

It may be possible for an on-demand system to satisfy a user's request for an on-demand session within minutes or even seconds, but the need to repeatedly, manually retry acquiring the session can be an enormous frustration to a user. Variations in the retry intervals (i.e., not retrying at precisely the correct moment) may cause the user to wait for their session longer than is necessary.

Accordingly, embodiments presented herein automate acquisition of requested on-demand sessions, without requiring manual retries by a user. These embodiments increase the efficiency of acquiring the session while improving the customer experience sufficiently to allow an operator to reduce the amount of capacity required to acceptably serve peaks in customer demand.

Figure 1:
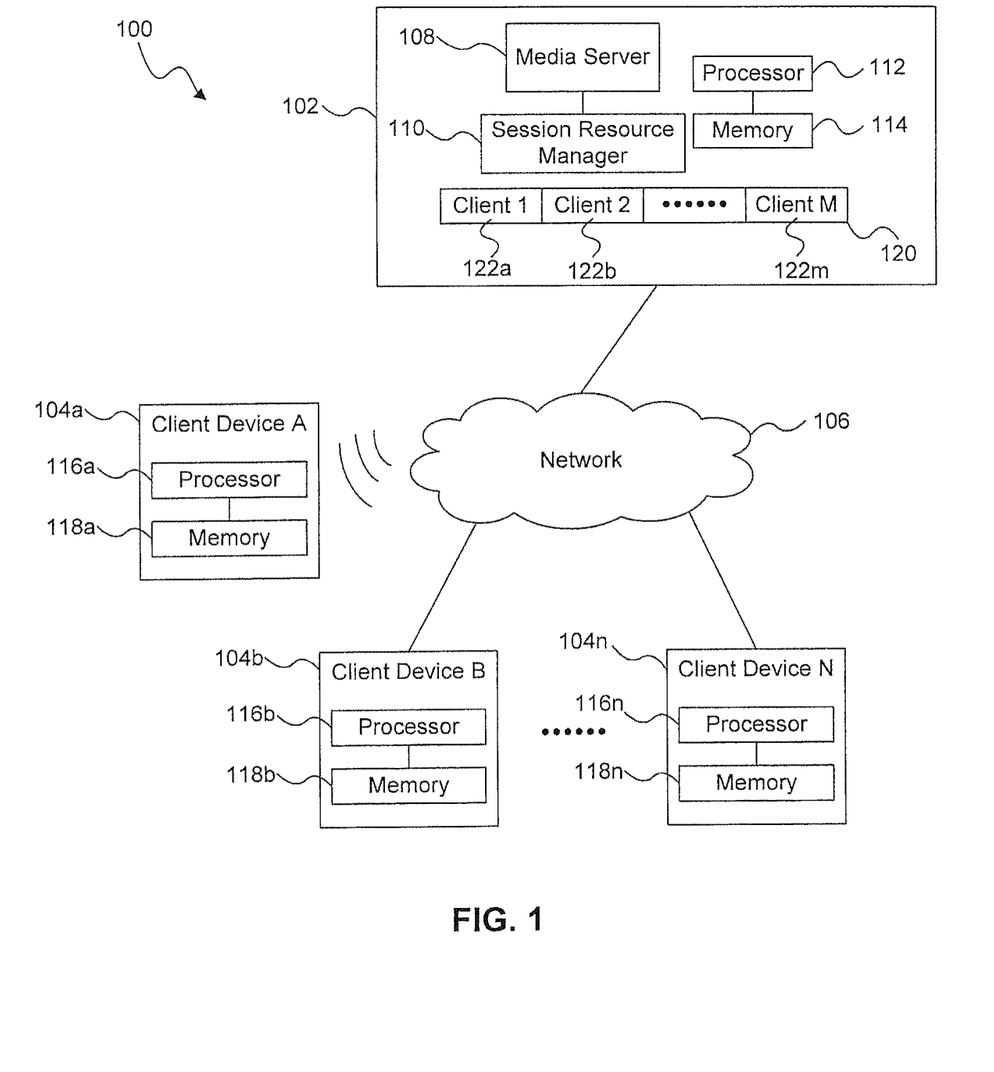
FIG. 1 illustrates an example system to provide on-demand services according to an embodiment of the invention.

FIG. 1 illustrates an example system 100 to provide on-demand services according to an embodiment of the invention. System 100 includes an on-demand server 102, client devices 104a-n and network 106. Client devices 104a-n are coupled to on-demand server 102 via network 106.

On-demand server 102 includes a media server 108, a session resource manager (SRM) 110 and a processor 112 coupled to memory 114. In an embodiment, SRM 110 may be separate from and external to on-demand server 102. On-demand server 102 may also include a queue 120 to queue on-demand requests. In an embodiment, on-demand server 102 may include multiple queues based on multiple service groups. Each of client devices 104 include a processor 116 coupled to a memory 118.

In an embodiment, on-demand server 102 is a Video-on-Demand (VOD) server providing VOD sessions to clients 104. On-demand server 102 may also be a video game server. It is to be appreciated that the on-demand server 102 could provide any type of audio/visual media. On-demand sessions as described herein refer to any content that is, generally, available only upon an explicit request from a client device 104. On-demand sessions may also be referred to as a "session" herein. On-demand server 102 may also be referred to as a "server" herein. On-demand server 102 may be part of a cable headend (not shown). In an example, an on-demand session is one or more of a video-on-demand (VOD) session, a switched video session or a video game session. In a VOD session, on-demand server 102 may provide media stored on media server 108. In a video game session, on-demand server 102 runs a video game, for example, on processor 112 and allows a client device 104 to play the video game remotely. In a switched video session, on-demand server 102 controls switching of real-time, linear video content that is continuously available within a cable headend, but only selectively available at customer premises. For any given user to access the switched video media, the user has to request it. The requested media is then transmitted to the user through a switch. Linear broadcasts, as described herein, refer to television channels that are continuously broadcast to all users and do not require a user to explicitly request or order the media or the television channel, in order to be delivered to the customer premises.

In an example embodiment for video-on-demand and switched video sessions, a client device 104 allows a user, if the user of client device 104 so decides, to view content that is readily available, such as linear broadcast channels, while waiting for their requested on-demand session to start. In an example embodiment for video game sessions, a client device 104 allows a first user of client device 104 the option of viewing an ongoing video game session of a second user while the first user is waiting for the requested video game session to start. In an example, client device 104 may receive notification from SRM 110 that resources are available to start the requested on-demand session. Upon receiving the notification, client device 104 may indicate to a user, while the user is viewing alternate readily available content, that the requested on-demand session is now available.

In an example, client 104 may be a television, a cable set top box, a portable media device such as an iPod Touch™, a WiFi device, a cellular device, or any other computational device that can receive media from on-demand server 102 either through wires or wirelessly.

Network 106 may be one of or a combination of a cable network such as Data Over Cable Service Interface Specification (DOCSIS), Internet, Wide Area Network (WAN), WiFi, Local Area Network (LAN), ATM or any other wired or wireless network. On-demand server 102 includes media server 102 that may provide content such as video over cable network, video over internet, video games over a cable network, video games over the internet or any other type of media over any type of network. Media server 108 may store and stream media including but not limited to photos, video, music and video games.

On-Demand Server

According to an embodiment of the invention, session resource manager 110 of on-demand server 102, upon receiving a request 122 from a client device 104 to start an on-demand session, determines if there are sufficient resources to start the on-demand session for the client device 104. SRM 110 inserts the request 122 in a queue, for example queue 120, if there aren't sufficient resources to start the on-demand session for the client device 104. SRM 110 starts the on-demand session by streaming the requested media from media server 108 for the client device 104 when there are sufficient resources available, it is the client device's turn in queue 120, and optionally, depending upon the application, the client confirms that they still want to start the on-demand session.

"Resources" as described herein refer to any type of hardware or software resource required to supply requested media content for an on-demand session. In an example, the resources may be, for example, bandwidth or computational resources. If on-demand server 102 is a VOD server or a switched video system, then the resource may be bandwidth. In another example, if on-demand server 102 is a video game server then the resource may be computational resources such as a number of processors or the percentage of a processor available, or available memory, to run a video game. In an embodiment, the bandwidth resources required for an on-demand session are based on the constant bit rate of the requested media, or the average and/or peak bit rate of requested variable bit rate media, in the on-demand session.

In an embodiment, queue 120 is a software based queue that stores requests 122 from client devices 104. In an alternate embodiment, queue 120 may be a hardware queue with a pre-determined depth. A hardware queue may be advantageous in speeding up the queuing process. In alternate embodiments, session resource manager 110 implements a First-in-First-out (FIFO) queue. In an alternate embodiment, session resource manager 110 may implement a round-robin queuing system. In another embodiment, certain users, for example a premium content subscriber, may be given access to resources to start a session ahead of standard content subscribers. It is to be appreciated that the methodology used to queue and schedule requests 122 from users is a design choice. It is to be appreciated that session resource manager 110 may be implemented in hardware, software, firmware or any combination thereof.

In an embodiment, session resource manager 110 automatically starts the session upon availability of resources to start the session. For example, for a switched video session, session resource manager 110 may start the on-demand session upon availability of sufficient resources, such as bandwidth. In another embodiment, the session resource manager 110 sends a notification to the client device 104 upon availability of sufficient resources to query whether a user using client device 104 still wants to start the on-demand session. In an embodiment, session resource manager 110 starts the on-demand session only if the user using client device 104 agrees to start the session within a period of time. In an embodiment, the period of time is a random period of time. In another example, the period of time is a pre-determined period of time. In a further example, the period of time is determined by the session resource manager 110. In a further example, the period of time is determined by SRM 110 based on a number of pending requests 122 in queue 120. In this example, SRM 110 may allow for a longer period of time if no or fewer than a pre-determined number of requests 122 are queued and a shorter period of time if there are more than a pre-determined number of requests 122 that are queued in queue 120. In another example, SRM 110 may determine the period of time based on whether requests 122 have been in queue 120 for more than a predetermined period of time. In yet another example, SRM 110 may determine the period of time based on projections of how long it will take before queued requests 122 can be fulfilled.

Reserving Resources

In an embodiment, session resource manager 110 receives a request for a first on-demand session, such as a Video On Demand session, from a client device 104. Session resource manager 110 grants the client device 104 the first on-demand session and allocates the resources for the first on-demand session for the client. Upon receiving indication of termination of the first on-demand session from the client, session resource manager 110 reserves the resources assigned to client device 104 for a period of time. For example, session resource manager 110 determines whether the client device 104 requests a second on-demand session within the period of time. If the client device 104 requests a second session within the period of time, then session resource manager 110 starts a second session for the client device 104 using the reserved resources.

In another embodiment, session resource manager 110 receives a request for a first switched video session from a client device 104. Session resource management 110 grants the client device 104 the first switched video session and allocates the resources for the first switched video session for the client. Upon receiving indication of termination or interruption of the first switched video session from the client, session resource manager 110 reserves the resources assigned to client device 104 for a period of time. For example, if a user changes the channel from the switched video session to, for example, a linear broadcast sports channel to check the score or to check the news on a linear broadcast news channel, then the first switched video session is interrupted. In another example, the user may simply decide to terminate the first switched video session. In another example, the first switched video session may be interrupted or terminated briefly because of interference signals or due to technical difficulties. Session resource manager determines whether the client device 104 continues the first switched video session or requests a second switched video session within the period of time. If the client device 104 continues the first switched video session or requests a second switched video session within the period of time, then session resource manager continues the first switched video session or starts the second switched video session for the client device 104 using the reserved resources.

If the client device 104 does not select a second on-demand session or continue the first on-demand session within the period of time, then session resource manager releases the reserved resources. If there is a next client device 104 that requests the resources or is in queue 120, then on-demand server 102 assigns the resources to the next client device 104 and starts a session for the next client device 104.

Client Device

In an embodiment, client device 104 sends a request for an on-demand session to an on-demand server 102. If client device 104 receives a response from the on-demand server 102 indicating unavailability of the on-demand session due to lack of sufficient resources at the on-demand server 102, then client device 104 automatically and periodically re-sends the request for the on-demand session to the on-demand server 102. In an embodiment, client device 104 queries a user using client device 104 to determine if the user would like client device 104 to automatically re-try to acquire the on-demand session prior to initiating the automatic and period re-tries. Client device 104 starts the on-demand session when the on-demand server 104 indicates that sufficient resources are available to start the requested session. In an alternate embodiment, client device 104 waits for the on-demand server 102 to indicate that the on-demand server 102 has sufficient resources to start the session instead of automatically and periodically re-sending the request for an on-demand session to on-demand server 102.

In an example the period for re-sending the request for an on-demand session to a client device 104 is a random period of time. In another example, the period of time is a pre-determined period of time. In a further example, the period of time is based on an exponential back-off system where the period of time to re-send a request increases exponentially after every request that is re-sent. In an alternate example, the period of time is determined by the session resource manager 110 and programmed into client device 104 by session resource manager 110.

In an example embodiment, for Video-on-demand and switched video sessions, client device 104 allows a user to view linear broadcast channels while waiting for their requested on-demand session to start if the user so desires. In another example, for video game sessions, client device 104 gives a user of client device 104 the option of viewing an ongoing video game session of another user while the user is waiting for the requested video game session to start.

Figure 2:
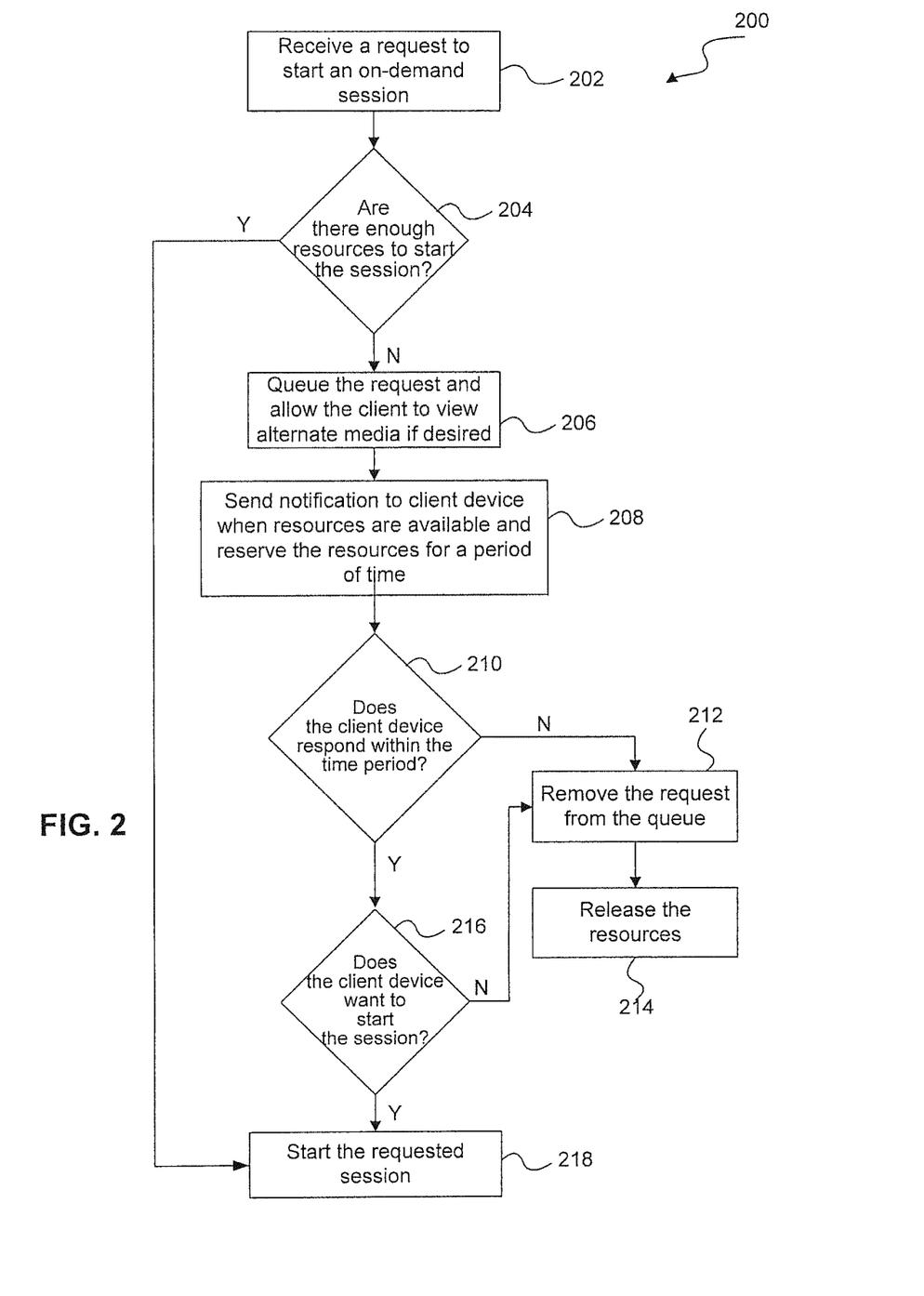
FIG. 2 illustrates an example flowchart illustrating steps performed by an on-demand server receiving a request to start an on-demand session according to an embodiment of the invention.
Figure 3:
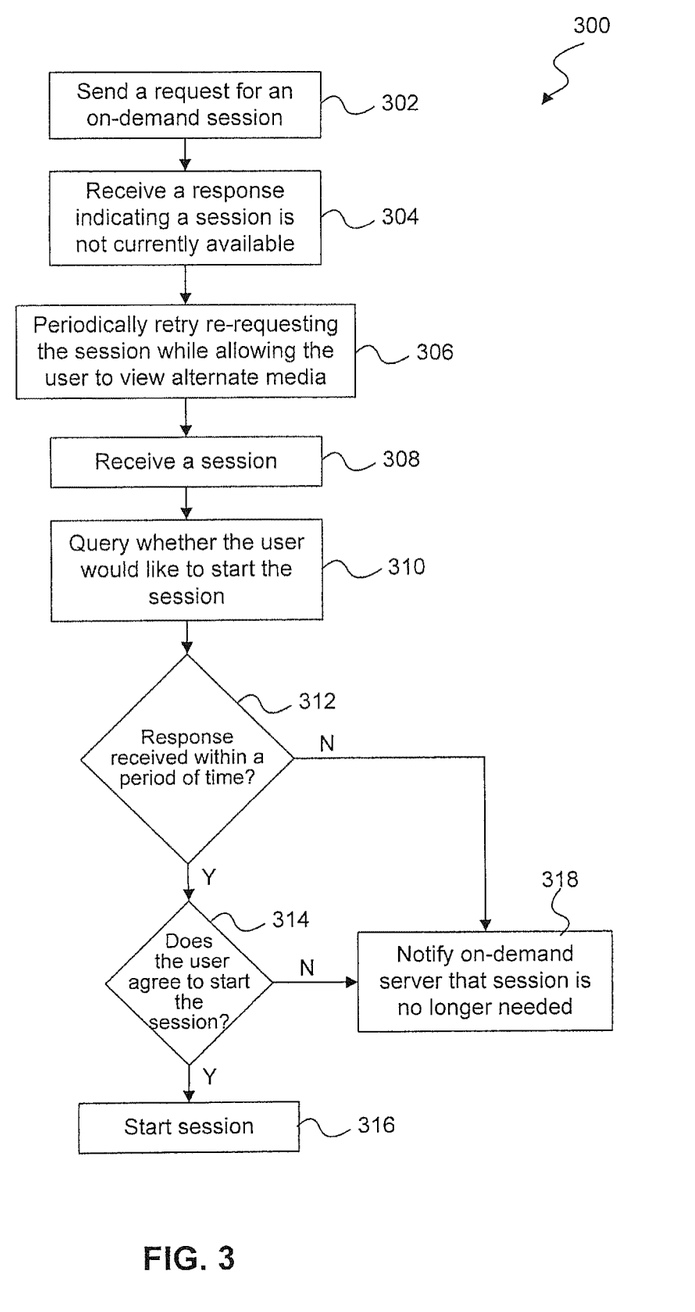
FIG. 3 illustrates an example flowchart illustrating steps performed by a client device requesting an on-demand session from an on-demand server according to an embodiment of the invention.
Figure 4:
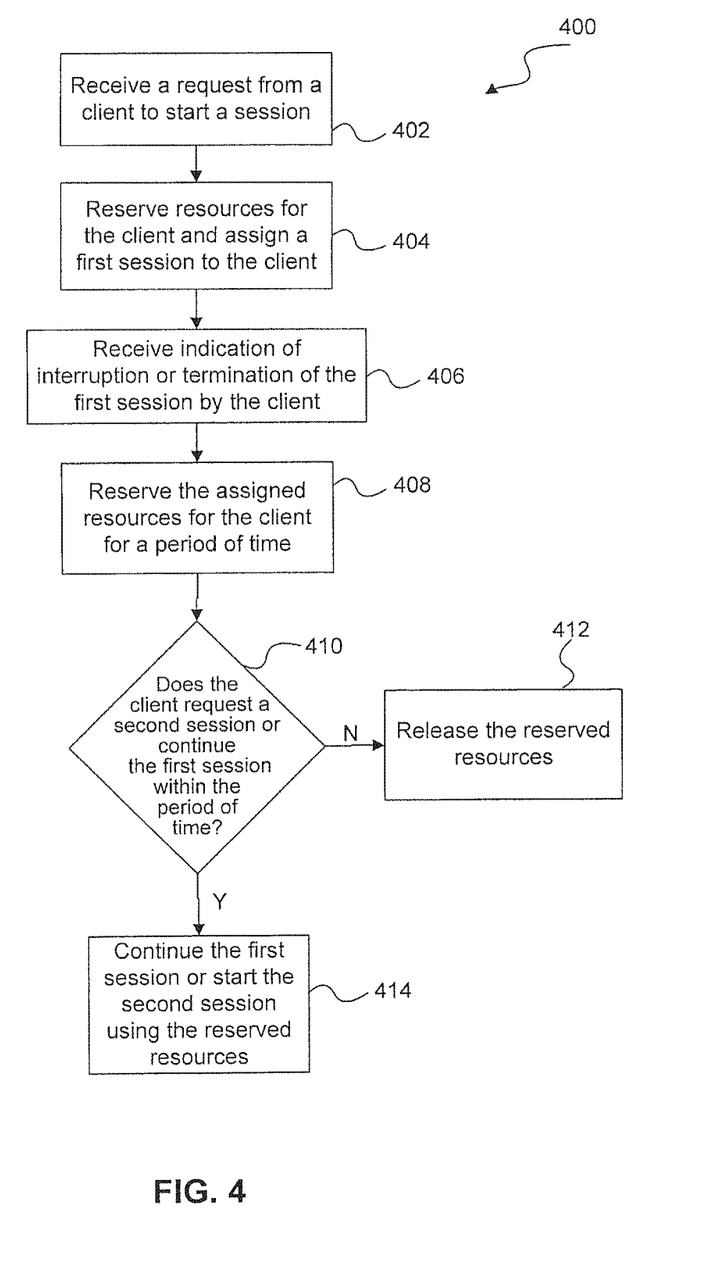
FIG. 4 illustrates an example flowchart illustrating steps performed by an on-demand server to manage and ongoing on-demand session according to an embodiment of the invention.
Figure 5:
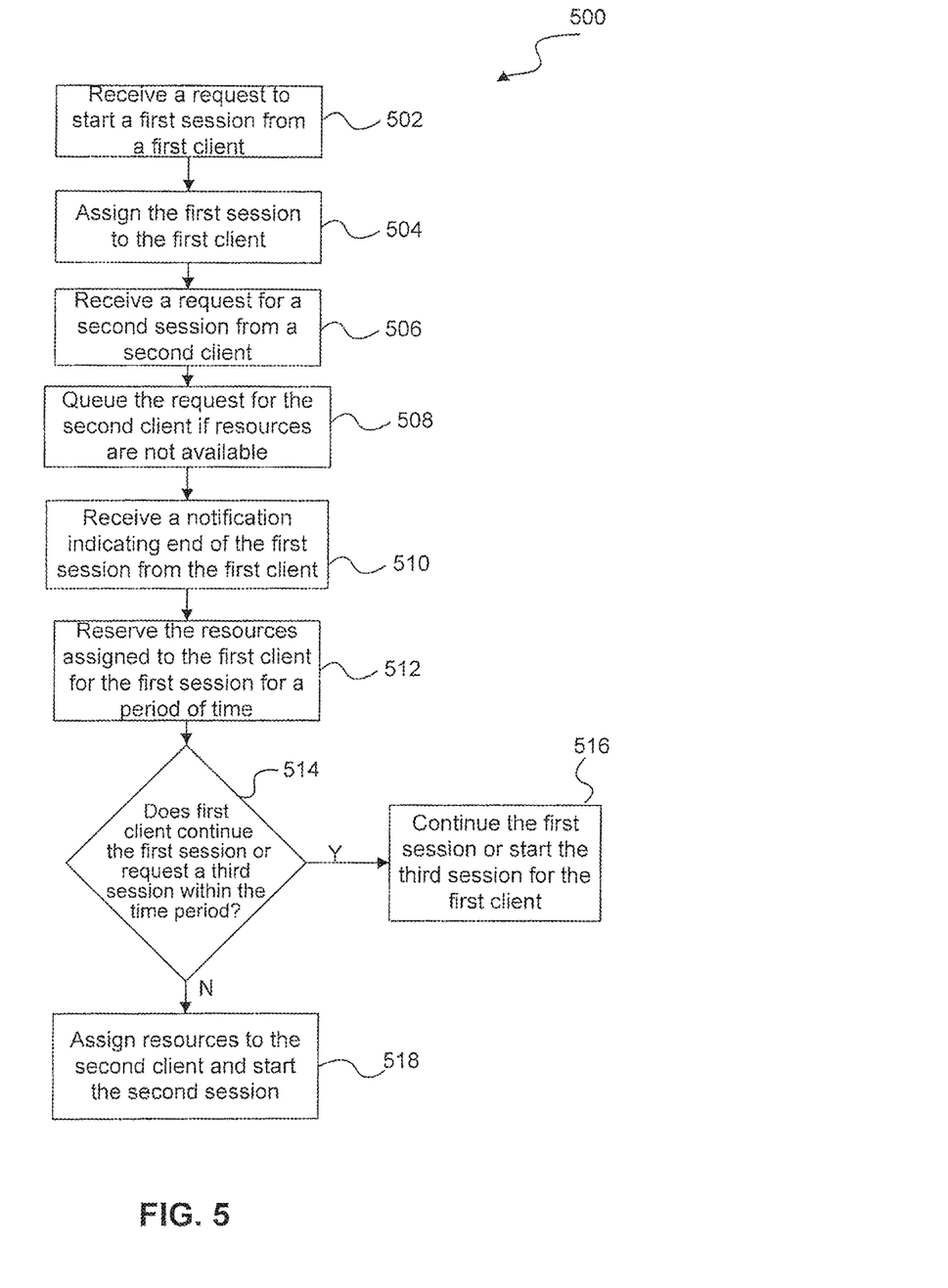
FIG. 5 illustrates an example flowchart illustrating steps performed by an on-demand server to manage ongoing on-demand sessions and allocate new on-demand sessions according to an embodiment of the invention.

In an example, memory 114 stores instructions that when executed by processor 112, cause processor 112 to perform the steps in the flowcharts of FIGS. 2, 4 and 5. In an example, memory 116 of client device 104 stores instructions that when executed by processor 116, cause processor 116 to perform the steps in the flowchart of FIG. 3.

Exemplary Flowcharts

FIG. 2 illustrates an example flowchart 200 illustrating steps performed by an on-demand server receiving a request to start an on-demand session according to an embodiment of the invention. Flowchart 200 will be described with reference to the example operating environment depicted in FIG. 1. In an example, the steps of flowchart 200 are performed by session resource manager 110. However, the flowchart is not limited to these embodiments. Note that some steps shown in flowchart 200 do not necessarily have to occur in the order shown.

In step 202, a request to start an on-demand session is received. For example, on-demand server 102 receives a request from a client device 104 to start an on-demand session.

In step 204, it is determined whether there are sufficient resources to start the on-demand session requested in step 202. For example, session resource manager 110 determines whether there are sufficient resources available to start an on-demand session requested by client device 104.

If it is determined that there are sufficient resources to start the on-demand session, then control proceeds to step 216.

If it is determined, that there are insufficient resources to start the session then control proceeds to step 206.

In step 206 the request for the on-demand session is placed in a queue while giving the client requesting the session the option to view alternate media while waiting for their requested session to start. For example, session resource manager 110 places a request 122 received in step 202 in queue 200 if there are insufficient resources to start the requested on-demand session.

In step 208, a notification is sent to the client device requesting the on-demand session in step 202 when there are sufficient resources available to start the requested on-demand session. The resources are also reserved for the client device that requested the on-demand session for a period of time. For example, session resource manager 110 sends a notification to the client device 104 indicating availability of resources to start the requested on-demand session while reserving resources for client 104 for a specific amount of time. If the requested session is a switched video session then, in an embodiment, control proceeds directly to step 218.

In step 210, it is determined whether the client device responds within the period of time. For example, session resource manager 110 determines whether client device 104 requesting the on-demand session responds within the period of time.

If it is determined, that the client device does not respond within the period of time then control proceeds to step 212.

If it is determined that the client device does respond within the predetermined time period then control proceeds to step 216.

In step 216, it is determined whether the client device accepts to start the session. For example, session resource manager 110 may receive a signal or a message from a client device 104 that requested the session indicating whether the client device accepts or rejects the session.

If it is determined that the client device accepts to start the session then control proceeds to step 218.

If it is determined that the client device does not agree to start the session, then control proceeds to step 212.

In step 212, the request by the client from step 202 to start the on-demand session is removed from the queue. For example, session resource manager 110 removes a request 122 stored in queue 120.

In step 214, the resources reserved for the on-demand request from step 202 are assigned released or if there is a next client requesting an on-demand session then the resources are allocated to the next client. For example, session resource manager 110 releases the reserved resources or assigns the reserved resources to a next client requesting an on-demand session if there is one.

In step 218, the requested on-demand session is started. For example, session resource manager starts the requested on-demand session for the client device 104 that initiated the request in step 202.

FIG. 3 illustrates an example flowchart 300 illustrating steps performed by a client device requesting an on-demand session from an on-demand server according to an embodiment of the invention. Flowchart 300 will be described with reference to the example operating environment depicted in FIG. 1. In an example, the steps of flowchart 200 are performed by processor 116 of client device 104 by executing instructions stored in memory 118. However, the flowchart is not limited to these embodiments. Note that some steps shown in flowchart 300 do not necessarily have to occur in the order shown.

In step 302, a request is sent to start an on-demand session. For example, client device 104a sends a request for an on-demand session to on-demand server 102.

In step 304, a response is received indicating that the requested on-demand session is currently unavailable due to lack of sufficient resources to start the on-demand session at the on-demand server. For example, a response is received from on-demand server 102 indicating that sufficient resources are not available to start the requested on-demand session.

In step 306, the client device automatically and periodically retries requesting the on-demand session. In an example, the client device also allows a user to view other content such as linear channels or a video game session of another user. In an example, the client device 104 queries whether the user would like for client device 104 to periodically and automatically request the on-demand session prior to step 306. For example, if the user would like to for client device 104a to automatically and periodically retry requesting the on-demand session, then client device 104a periodically and automatically retries requesting the on-demand session from on-demand server 102.

In step 308, a notification is received indicating that the requested on-demand session is now available. For example, a notification is received from on-demand server 102 indicating that the requested on-demand session is now available. In an embodiment, if the requested on-demand session is a switched video session then instead of step 308, control proceeds to step 316.

In step 310, the user is queried whether they would still like to start the on-demand session. For example, client device 104a may prompt the user as to whether the user would like to start the on-demand session. In an example, client device 104a may prompt the user by using a pop-up window. The user may then select whether to start the on-demand session or to abort it.

In step 312, it is determined whether a response is received from the user in a period of time. For example, client device 104a determines whether the user using client device 104a responds to the query to start the on-demand session within a period of time.

If the user does not respond in the time period then control proceeds to step 318.

If the user responds within the time period then control proceeds to step 314.

In step 314, it is determined whether the user agrees to start the on-demand session. For example, client device 104a based on user input determines whether the user wants to start the on-demand session.

If the user decides to start the on-demand session then control proceeds to step 316.

If the user decides to not start the on-demand session then control proceeds to step 318.

In step 318, the on-demand server is notified that the on-demand session is no longer needed. For example, client device 104a notifies on-demand server 102 that the on-demand session requested in step 302 is no longer needed.

In step 316, the on-demand session is initiated. For example, client device 104a notifies on-demand server 102 to start the requested session. In the case where the on-demand session is a switched video session, then the switched video session is started automatically by on-demand server 102 without waiting for confirmation from client device 104a.

FIG. 4 illustrates an example flowchart 400 illustrating steps performed by an on-demand server to manage an on-going on-demand session according to an embodiment of the invention. Flowchart 400 will be described with reference to the example operating environment depicted in FIG. 1. In an example, the steps of flowchart 400 are performed by session resource manager 110. However, the flowchart is not limited to these embodiments. Note that some steps shown in flowchart 400 do not necessarily have to occur in the order shown.

In step 402, a request is received to start a first on-demand session. For example, on-demand server 102 receives a request from client device 104b to start an on-demand session.

In step 404, if resources are available to start the first on-demand session, then the resources are reserved for the client device and the first on-demand session is initiated. For example, session resource manager 110 reserves resources for client 104b and starts the requested first on-demand session for client 104b.

In step 406, notification is received of interruption of the first on-demand session by the client or termination of the first on-demand session by the client. For example, if a user changes the channel from the on-demand session to, for example, a sports channel to check the score or to check the news on a news channel, then the first on-demand session is interrupted. In another example, the user may simply decide to terminate the first on-demand session. In another example, the first on-demand session may be interrupted or terminated briefly because of interference signals or due to technical difficulties. In an example, session resource manager 110 receives an indication from client 104b of interruption or termination of the first on-demand session by client device 104b.

In step 408, the resources assigned to the client device for the first on-demand session are reserved for a period of time. For example, session resource manager 110 reserves the resources allotted to client 104b for a period of time upon receiving the indication of interruption or termination of the first on-demand session by client 104b.

In step 410, it is determined whether the client continues the first on-demand session or requests a second on-demand session within the period of time. For example, session resource manager 110 determines whether client 104b continues the first on-demand session if interrupted or starts a second session if the first on-demand session was terminated, within a period of time.

If it is determined that the client does not continue the first on-demand session or request a second on-demand session, then control proceeds to step 412. If it is determined that the client desires to continue the first on-demand session or to request a second on-demand session then control proceeds to step 414.

In step 412, the reserved resources are released and if there is a next client requesting the resources for an on-demand session then the resources are allocated to the next client.

In step 414, the first session is continued or a second session is started based on user selection at the client device using the reserved resources. For example, client device 104 continues the first session or starts a second session using the reserved resources based on user input.

FIG. 5 illustrates an example flowchart 500 illustrating steps performed by an on-demand server to manage existing on-demand sessions and allocate or assign new on-demand sessions according to an embodiment of the invention. Flowchart 500 will be described with reference to the example operating environment depicted in FIG. 1. In an example, the steps of flowchart 500 are performed by session resource manager 110. However, the flowchart is not limited to these embodiments. Note that some steps shown in flowchart 500 do not necessarily have to occur in the order shown.

In step 502, a request is received to start a first on-demand session from a first client. For example, session resource manager 110 receives a request from client 104a to start a first on-demand session.

In step 504, the first on-demand session is initiated. For example, session resource manager 110 determines that there are sufficient resources to start the first session and starts the first on-demand session for client 104a.

In step 506, a request is received from a second client to start a second on-demand session. For example, session resource manager 110 receives a request from client 104b to start an on-demand session.

In step 508, the request to start the second on-demand session is placed in a queue if it is determined that sufficient resources are not available to start the second on-demand session. For example, session resource manager 110 determines that if sufficient resources are not available to start second on-demand session requested by client 104b, then session resource manager 110 may store the request in a queue 120.

In step 510, the session resource manager 110 receives a notification indicating interruption or termination of the first session by the first client. For example, session resource manager 110 receives a notification from client 104a indicating interruption of the first on-demand session or termination of the first on-demand session.

In step 512, the resources assigned to the first client are reserved. For example, session resource manager 110 reserves the resources assigned to client 104a for a period of time.

In step 514, it is determined whether the first client continues the first session or requests a third session within the period of time. For example, in a conventional VOD system, two separate on-demand sessions would be created if the first client wished to view a trailer followed by a movie. Because creation of these sessions are independent, in a busy system, a failure to assign resources required to view the movie after the trailer could occur at any time. The first client may successfully view the trailer but then fail to view the movie, for lack of sufficient resources because they were assigned to the second user between the completion of the trailer and the first user's command to order the movie.

If it is determined that the first client wishes to continue the first session or to start a third session within the period of time, then control proceeds to step 516.

If it is determined that the first client does not wish to continue the first session or to start a third session within the period of time then control proceeds to step 518.

In step 516, the first session is continued or a third session is started using the reserved resources from step 512 based on user input at client 104*a*.

In step 518, the resources reserved in step 512 are allocated to the second client to start the second session. For example, session resource manager 110 allocates the resources reserved for client 104*a* in step 512 to client 104*b* and starts the second session for client 104*b*.

The embodiments presented herein apply to any type of data transfer between two or more devices. The representative functions described herein (e.g. steps in flowchart 2-5) can be implemented in hardware, firmware, software, or some combination thereof. For instance, the steps of flowcharts 2-5 can be implemented using computer processors, such as processor 112, processor 116, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Exemplary General Purpose Computer System

Figure 6:
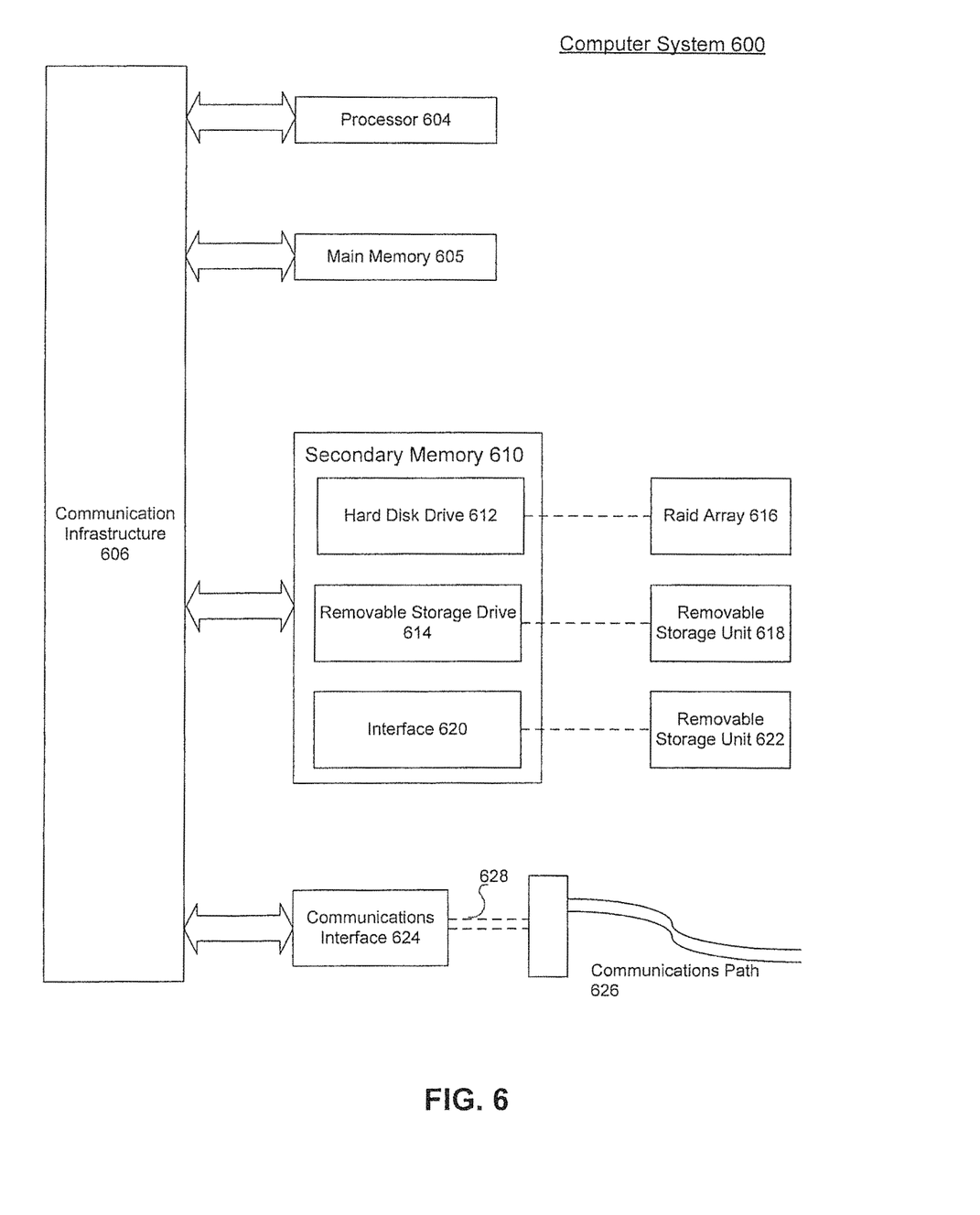
FIG. 6 is a block diagram of a computer system on which the present invention can be implemented.

The following describes a general purpose computer system that can be used to implement embodiments of the invention presented herein. The present invention can be implemented in hardware, or as a combination of software and hardware. Consequently, the invention may be implemented in the environment of a computer system or other processing system. An example of such a computer system 600 is shown in FIG. 6. The computer system 600 includes one or more processors, such as processor 604. Processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 605, preferably random access memory (RAM), and may also include a secondary memory 610. The secondary memory 610 may include, for example, a hard disk drive 612, and/or a RAID array 616, and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

The terms "computer program medium" and "computer usable medium" are used herein to generally refer to media such as removable storage drive 614 and a hard disk installed in hard disk drive 612. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the processes of the present invention. For example, when executed, the computer programs enable processor 604, processor 112 or processor 116 to implement part of or all of the steps described above with reference to FIGS. 2-5. Where the invention is implemented using software, the software may be stored in a computer program product and loaded into computer system 600 using raid array 916, removable storage drive 914, hard drive 912 or communications interface 924.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method in an on-demand server, comprising:
   receiving a first request from a client for a first on-demand session;
   determining whether resources are available to start the first on-demand session;
   sending a first notification indicating availability of the resources to start the first on-demand session when the resources become available;
   starting the first on-demand session in response to receiving a response to the first notification during a first time period to start the first on-demand session, the first time period being based on a number of requests for on-demand sessions pending in a queue;
   receiving a second notification of termination of the first on-demand session;
   reserving the resources for the client for a second time period upon the termination of the first on-demand session; and
   starting a second on-demand session for the client using the resources when a second request for the second on-demand session is received from the client during the second time period.

2. The method of claim 1, further comprising assigning the resources to a second client when the client does not request the second on-demand session during the second time period.

3. The method of claim 1, further comprising releasing the resources when the client does not request the second on-demand session within the second period of time or when the client does not respond within the second period of time.

4. The method of claim 1, further comprising:
   receiving a third request from a second client for a third on-demand session;
   placing the third request in the queue when sufficient resources are not available for the third on-demand session; and
   allowing the second client to view linear or switched video broadcasts while waiting for the sufficient resources to start the third on-demand session.

5. The method of claim 4, further comprising allowing the second client to view a video game session while waiting for the sufficient resources for the third on-demand session.

6. The method of claim 1, wherein the time period is determined by the on-demand server based on the number of requests for the on-demand sessions pending in the queue.

7. The method of claim 1, wherein the on-demand server comprises a Video-on-Demand (VOD) server, and
   wherein the first on-demand session and the second on-demand session comprise VOD sessions.

8. The method of claim 1, wherein the first on-demand session or the second on-demand session comprises a switched video session.

9. The method of claim 1, wherein the first on-demand session and the second on-demand session comprise video game sessions, and
   wherein the on-demand server comprises a video game server.

10. The method of claim 1, further comprising:
    determining the first time period to be a first duration when the number of requests for the on-demand sessions pending in the queue is less than a pre-determined number of requests or a second duration, less than the first duration, when the number of requests for the on-demand sessions pending in the queue is greater than the pre-determined number of requests.

11. A system in an on-demand server, comprising:
    a memory that stores instructions; and
    a processor configured to execute the instructions, the instructions, which when executed by the processor, configuring the processor to:
      receive a first request from a client for a first on-demand session during a first time period,
      determine whether resources are available to start the first on-demand session,
      send a first notification indicating availability of the resources to start the first on-demand session when the resources become available,
      start the first on-demand session in response to receiving a response to the first notification within a first time period to start the first on-demand session, the first time period being based on a number of requests for on-demand sessions pending in a queue,
      receive a second notification of termination of the first on-demand session,
      reserve the resources for the client for a second time period upon the termination of the first on-demand session, and
      start a second on-demand session for the client using the resources when a second request for the second on-demand session is received from the client during the second time period.

12. The system of claim 11, wherein the instructions, which when executed by the processor, further configure the processor to assign the resources to a second client when the client does not request the second on-demand session during the second time period.

13. The system of claim 11, wherein the instructions, which when executed by the processor, further configure the processor to release the resources when the client does not request the second on-demand session or when the client does not respond within the second period of time.

14. The system of claim 11, wherein the instructions, which when executed by the processor, further configure the processor to:
    receive a third request from a second client for a third on-demand session, place the third request in the queue when sufficient resources are not available for the third on-demand session, and allow the second client to view linear or switched video broadcasts while waiting for the sufficient resources for the third on-demand session.

15. The system of claim 14, wherein the instructions, which when executed by the processor, further configure the processor to allow the second client to view a video game session while waiting for the sufficient resources for the third on-demand session.

16. The system of claim 11, wherein the first time period is determined by the on-demand server based on the number of requests for the on-demand sessions pending in the queue.

17. The system of claim 11, wherein the on-demand server comprises a Video-on-Demand (VOD) server, and wherein the first on-demand session and the second on-demand session comprise VOD sessions.

18. The system of claim 11, wherein the first on-demand session and the second on-demand session comprise video game sessions, and wherein the on-demand server is a video game server.

19. The system of claim 11, wherein the instructions, which when executed by the processor, further configure the processor to determine the first time period to be a first duration when the number of requests for the on-demand sessions pending in the queue is less than a pre-determined number of requests or a second duration, less than the first duration, when the number of requests for the on-demand sessions pending in the queue is greater than the pre-determined number of requests.

20. A system, comprising:
a memory that stores instructions; and
a processor configured to execute the instructions, the instructions, which when executed by the processor, configuring the processor to:
send a first notification when resources become available to start a first on-demand session,
start a first on-demand session in response to receiving a response to the first notification during a first time period to start the first on-demand session, the first time period being based on a number of requests for on-demand sessions pending in a queue;
receive a second notification to pause or terminate the first on-demand session;
reserve the resources for the client for a second time period; and
resume the first on-demand session using the resources based on whether a second request to resume the first on-demand session is received from the client or start a second on-demand session using the resources based on whether a third request for the second on-demand session is received from the client during the second time period.

21. The system of claim 20, wherein the instructions, which when executed by the processor, further configure the processor to determine the first time period to be a first duration when the number of requests for the on-demand sessions pending in the queue is less than a pre-determined number of requests or a second duration, less than the first duration, when the number of requests for the on-demand sessions pending in the queue is greater than the pre-determined number of requests.

* * * * *